United States Patent [19]

Nakamura et al.

[11] Patent Number: 4,914,945
[45] Date of Patent: Apr. 10, 1990

[54] VESSEL SPEED DETECTING DEVICE

[75] Inventors: Kazuhiro Nakamura; Tatsuya Yoshioka, both of Hamamatsu; Ryoji Sawada; Tomoji Nakamura, both of Iwata, all of Japan

[73] Assignee: Sanshin Kogyo Kabushiki Kaisha, Hamamatsu, Japan

[21] Appl. No.: 257,765

[22] Filed: Oct. 14, 1988

[30] Foreign Application Priority Data

Oct. 16, 1987 [JP] Japan ................................ 62-259563

[51] Int. Cl.$^4$ ............................................. G01C 21/10
[52] U.S. Cl. ................................................... 73/182
[58] Field of Search ................. 73/181, 182, 183, 184, 73/185, 186, 187, 195, 196, 197, 204.73; 364/571.04; 340/984, 441

[56] References Cited

U.S. PATENT DOCUMENTS

| 1,525,963 | 2/1925 | Sperry | 340/984 |
| 4,103,161 | 7/1978 | Thomasson | 73/195 |
| 4,759,216 | 7/1988 | Carpenter et al. | 73/182 |
| 4,821,567 | 4/1989 | Nakamura et al. | 73/182 |

Primary Examiner—Donald O. Woodiel
Attorney, Agent, or Firm—Ernest A. Beutler

[57] ABSTRACT

A number of embodiments of watercraft speed detecting devices embodying a dynamic semiconductor pressure sensor that has high accuracies at most speed ranges and another speed sensor that has a higher degree of accuracy than the semiconductor pressure sensor at a certain range and that speed is displayed at that certain range. The other speed sensor may be of a wide variety of types such as a magnetic current meter, a propeller type speed sensor, or a tachometer that is driven by the engine and associated circuitry for calculating watercraft speed from engine speed.

14 Claims, 6 Drawing Sheets

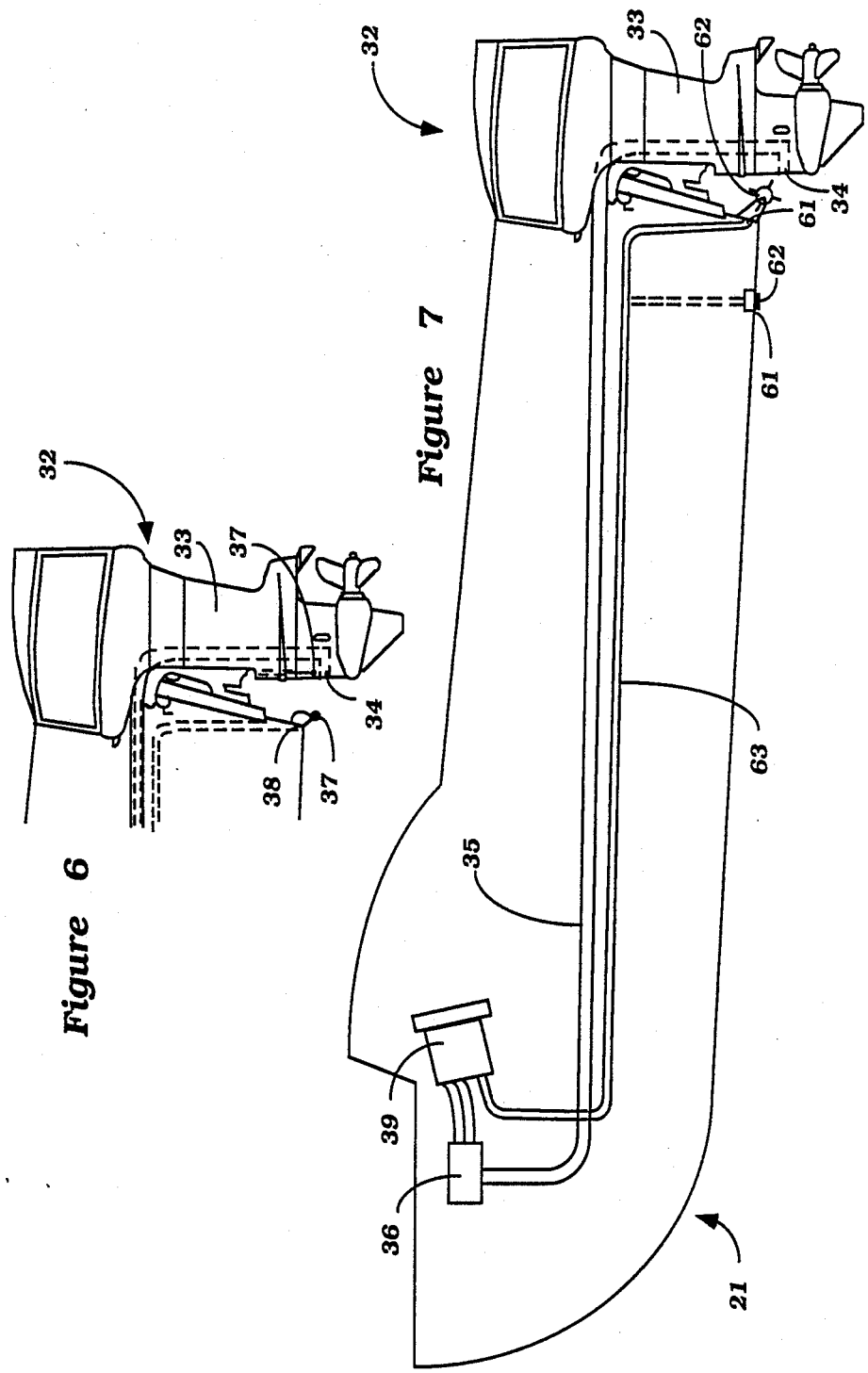

83 → revolution number signal for tachometer
84 → to battery

Figure 10
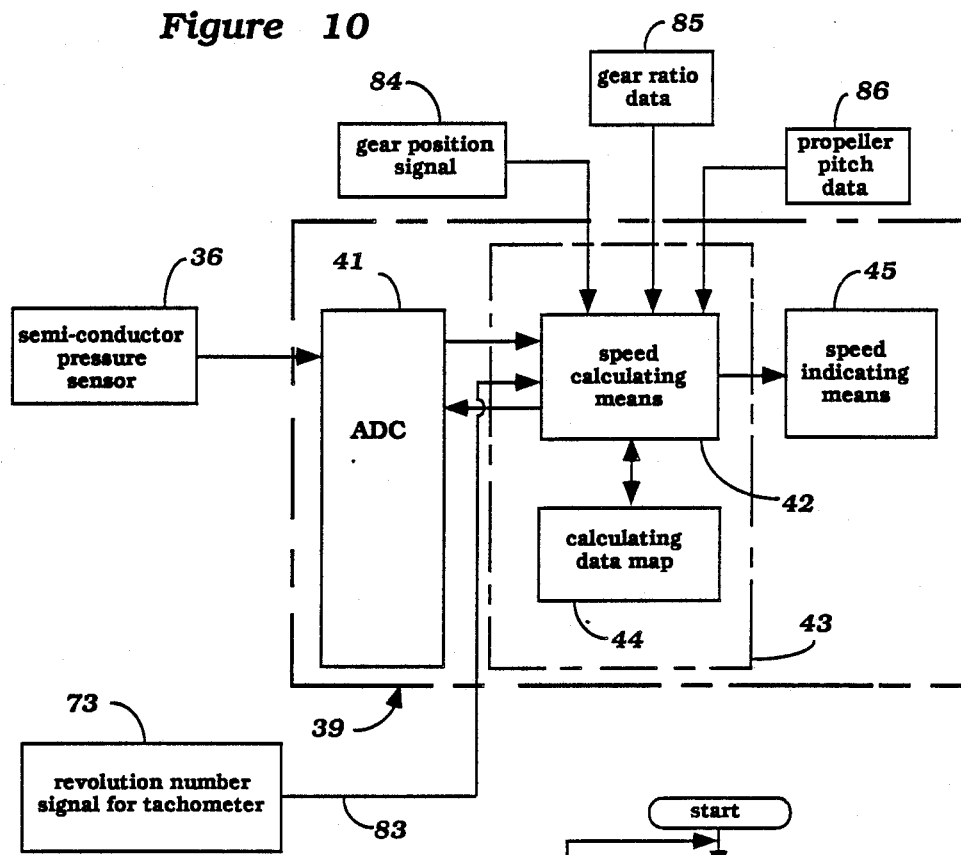
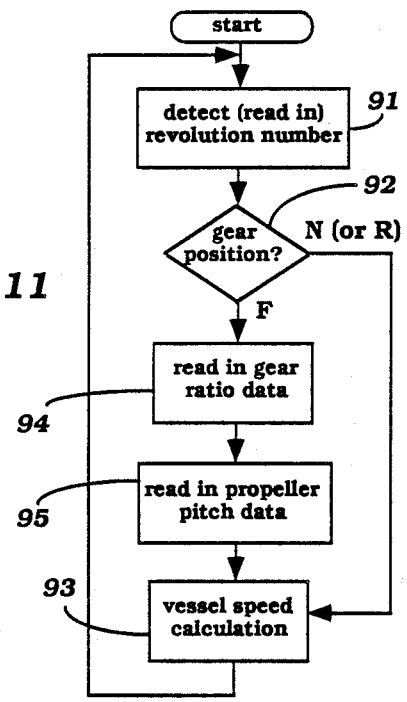
Figure 11

VESSEL SPEED DETECTING DEVICE

BACKGROUND OF THE INVENTION

This invention relates to a vehicle speed detecting device and more particularly to a device for indicating vehicle speed that is accurate through all anticipated ranges of speed travel.

It is, of course, desirable to provide with many types of vehicles a speed indicator that indicates the speed of travel of the vehicle. Although achieving this goal with land vehicles is relatively simple, it is a much more complicated problem in connection with water vehicles. The reason for this is that there area a wide variety of factors which can effect the accuracy of a water speed indicator in a watercraft.

Recently, it has been discovered that a very effective water speed indicator can be provided by utilizing a source of pressure on the hull of the watercraft or associated with it that senses the dynamic pressure created by the movement of the hull through the water. A pressure transducer of the semiconductor type is employed to convert the water pressure signal into an electrical signal that can be employed to provide a speed indication for the watercraft. A type of system constructed in accordance with this principle is disclosed in the copending application for United States Letters Patent entitled "Speedometer For Marine Vessels", Ser. No. 160,124, filed Feb. 25, 1988 in the name of Kazuhiro Nakahama et al, and assigned to the assignee of this application.

FIG. 1 of the drawings shows generally a system of the type shown in that application wherein a watercraft, indicated generally by the reference numeral 21, has an outboard motor 22 affixed to its transom. The outboard motor 22 includes a drive shaft shaft housing and lower unit 23 in which a forwardly facing pressure sensing opening 24 is formed. A conduit 25 extends from the pressure sensing opening 24 through the hull of the watercraft 21 to a pressure transducer 26 that provides an output signal that is indicative of pressure and a conversion of this pressure signal into a digital signal indicative of speed. An indicator 27 is positioned in the operator's compartment of the watercraft 21 and displays watercraft speed.

FIG. 2 is a graph showing the relationship between pressure P sensed by the sensing device 26 and speed of the watercraft v. It will be seen that at lower speeds and pressures, the pressure speed curve has a relatively sharp incline. At higher speeds, however, the pressure speed relationship is more nearly constant. Basically, the following equation holds between the dynamic pressure P and vessel speed v:

$$v = \sqrt{a \cdot P + b/P + c}.$$

That is, the lower the vessel speed, the larger of the ratio of vessel speed increment to the dynamic pressure increment as clearly revealed in FIG. 2. Normally, the output from the device is transmitted to an analog to digital converter (ADC) that divides the output from the semiconductor pressure sensor 26 uniformly into a number of steps, such as 256 steps. As a result, as the watercraft speed becomes lower, the resolution of the ADC also becomes lower and the detected speed accuracy is deteriorated. Furthermore, the detection of low pressure levels is difficult due to the varying characteristics which exist at the pressure sensing opening 24 under low speed and pressure conditions.

It is, therefore, an object of this invention to provide an improved, simplified speed detecting device for a watercraft.

It is a further object of this invention to provide a watercraft speed detecting device that is accurate at all speed conditions.

SUMMARY OF THE INVENTION

This invention is adapted to be embodied in a running speed detector for a watercraft that comprises a hull and a first speed sensor that is responsive to dynamic water pressure at a point to provide an output signal indicative of speed. The output signal has a range of pressure where the speed indication signal is less accurate than at other ranges. A second speed sensor is provided that has a high degree of accuracy in that one range. Display means are incorporated for receiving signals from the first and second speed sensors and displaying the output of the second speed sensor when the one speed range and the output of the first speed sensor at other ranges.

BRIEF DESCRIPTION OF THE DRAWINGS

FIG. 6 is a partial, side elevational view, in part similar to FIGS. 1 and 3, and shows a second embodiment of the invention.

FIG. 7 is a side elevational view, in part similar to FIGS. 1, 3 and 6, and shows a still further embodiment of the invention.

FIG. 10 is a block diagram showing the construction and operation of the embodiment shown in FIG. 7.

FIG. 11 is a flow chart showing the routine of operation of this embodiment.

DETAILED DESCRIPTION OF THE PREFERRED EMBODIMENTS

Figures 1, 2:
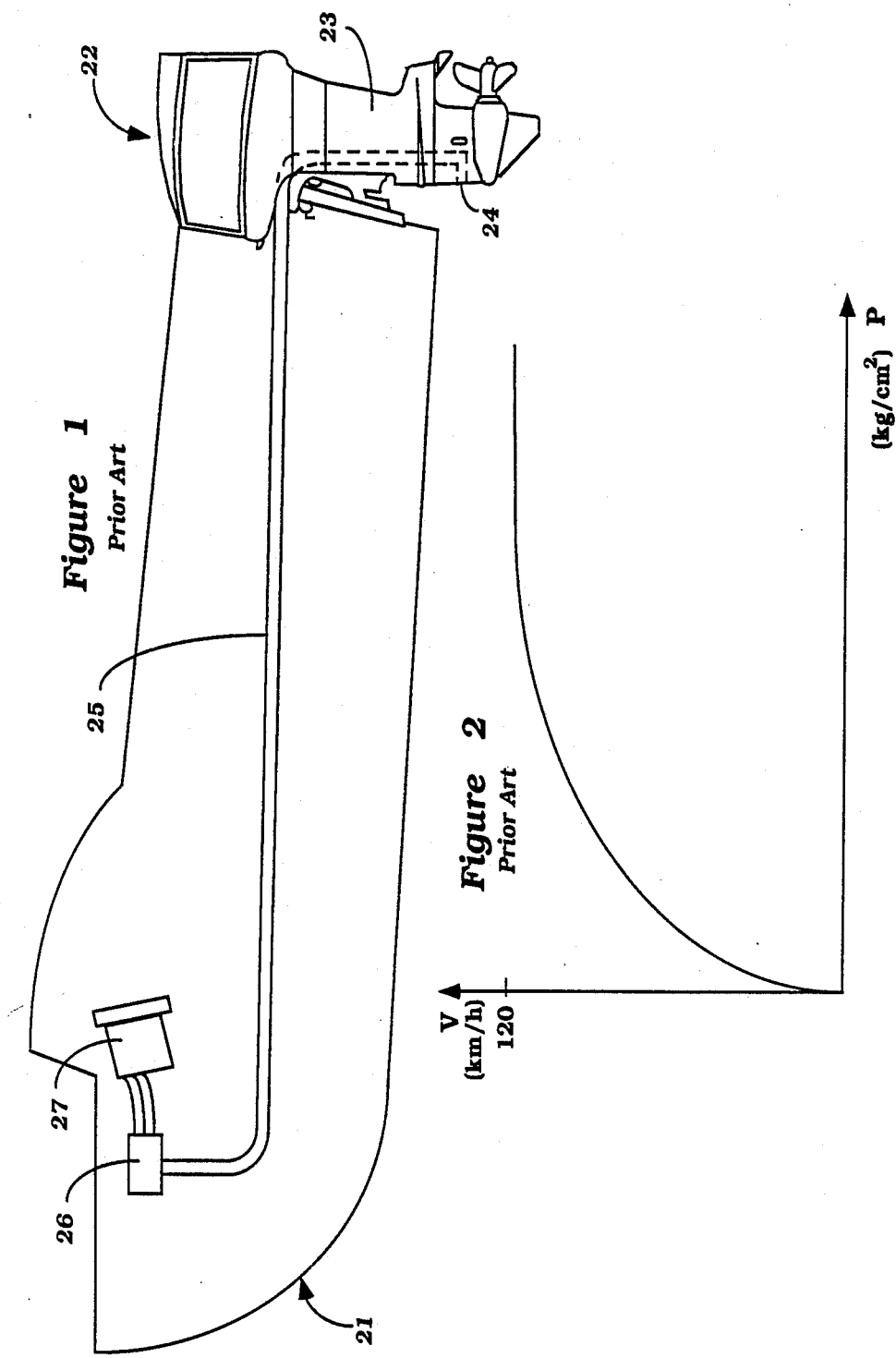
FIG. 1 is a side elevational view, in partially schematic form, of a watercraft having a speed indicating device constructed in accordance with a prior art system.
FIG. 2 is a graphical analysis showing the relationship of the sensed water pressure to the speed of travel of the watercraft in conjunction with the prior art and specifically the pressure sensor characteristics.
Figure 3:
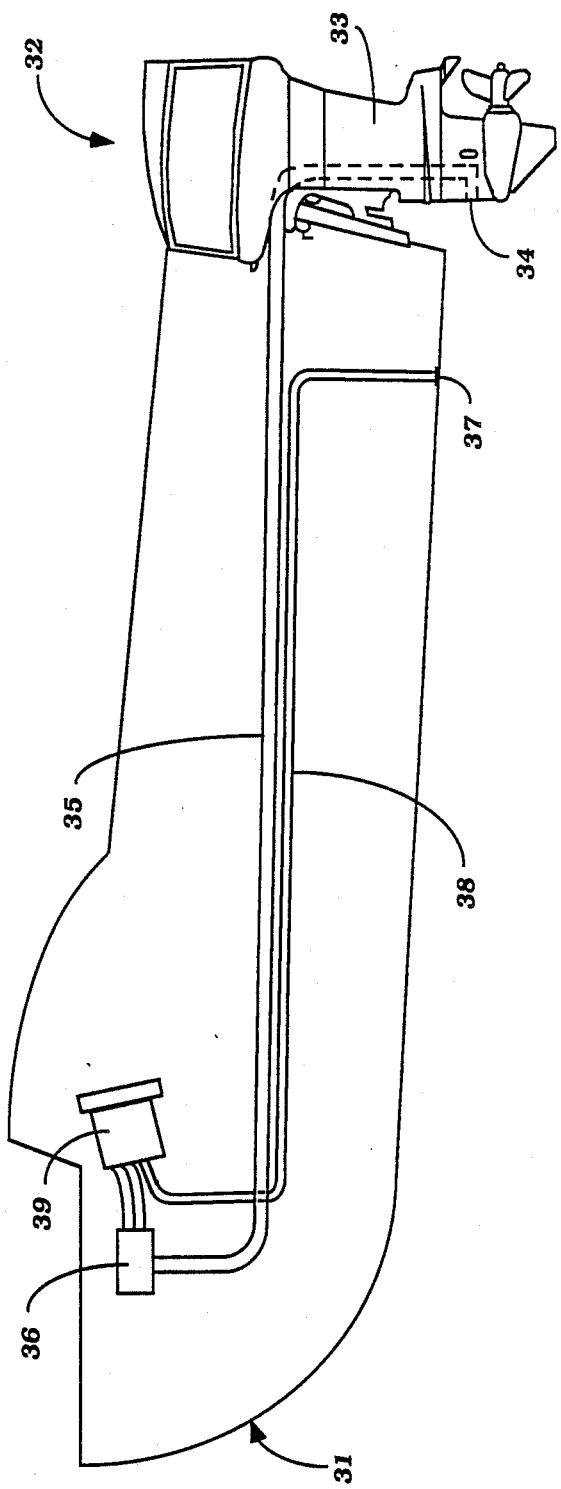
FIG. 3 is a side elevational view, in part similar to FIG. 1, showing a watercraft having a vehicle speed detecting device constructed in accordance with a first embodiment of the invention.

Referring now to FIG. 3, a watercraft constructed in accordance with an embodiment of the invention is identified generally by the reference numeral 31 and has affixed to its transom an outboard motor 32. As with the prior art type of arrangements, the outboard motor 32 includes a drive shaft housing and lower unit 33 in which a forwardly facing pressure sensing opening 34 is provided. A conduit 35 extends from the opening 34 through the hull of the watercraft 31 to a semiconductor pressure sensor 35 which will output a signal indicative of pressure at the opening 34 and of speed. The output of the sensor 36 generally follows the configuration of the prior art type of sensor as shown in FIG. 2.

In accordance with the invention, a magnetic current meter, indicated generally by the reference numeral 37, is positioned on the underside of the hull of the watercraft 31. As is well known, this type of device provides an output signal that is indicative of speed. This output signal is transmitted through a conductor 38 to a combined processing and indicating unit 39 which also receives signals from the semiconductor pressure sensor 36 and processes them in accordance with a routine to be described. It should be noted that the magnetic current meter 37 has a high degree of accuracy over a relatively low speed range, this being the range when the semiconductor pressure sensor 36 has its poor degree of resolution, for a reason which will become apparent.

Figure 4:
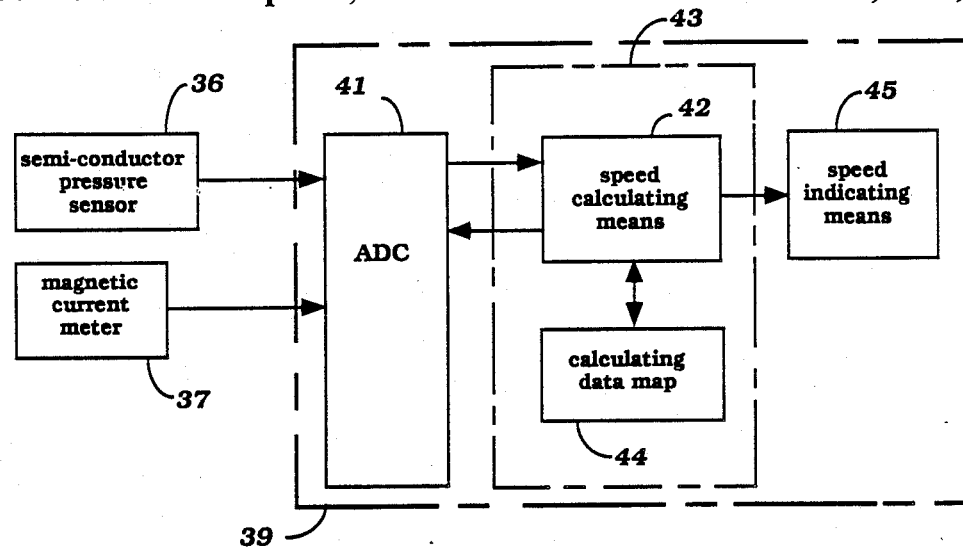
FIG. 4 is a block diagram showing the relationship of the components of this embodiment.

Referring now to FIG. 4, it will be seen that the semiconductor pressure sensor 36 and magnetic current meter 37 both output their signals to the calculating and indicating device 39 and specifically to an analog to digital converter 41 of that device. The analog to digital converter transmits and receives signals from a speed calculating device 42, in accordance with a program to be described. The speed calculating device 42 forms a portion of a mini-computer 43 or CPU which also includes a calculating data map 44 that transmits and receives signals from the speed calculating device 42. The speed calculating device 42 also outputs a signal to a speed indicating device 45 which may be in the form of a digital display or an analog signal, as is preferred.

Figure 5:
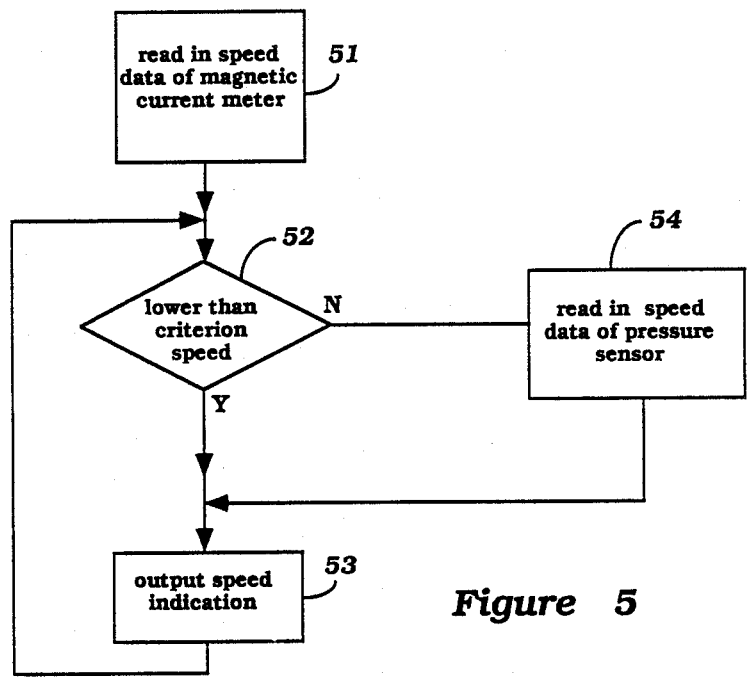
FIG. 5 is a flow chart showing the method and steps of operation of this embodiment of the invention.

Referring now to FIG. 5, the routine under which the device operates will be described. In FIG. 5, the routine of the CPU 43 is shown. First, at the step 51, the device reads the output signal transmitted from the magnetic current meter 37 through the ADC 41 to the speed calculating device 42. The program then moves to the step 52 so as to make a determination as to whether the speed indicated by the magnetic current meter 37 is lower than the speed at which the accuracy and resolution of the semiconductor pressure sensor 36 is high. If the device is operating in the low speed range wherein the magnetic current meter 37 has higher accuracy than the semiconductor pressure sensor 36, the program moves to the step 53 wherein the output signal of the magnetic current meter is displayed by the speed indicating device 45.

If, however, at the step 52 it is determined that the speed is in excess of the minimum speed at which the accuracy of the semiconductor pressure sensor 36 is high, the program moves to the step 44 so as to operate and process the speed data received from the semiconductor pressure sensor 36 and transmit it from the ADC 41 to the speed calculating means 42. At that point, the speed calculating means 42 outputs a signal indicative of speed derived from the calculating data map 44 to the speed indicating means by progressing to the step 53 wherein this data is displayed. As a result, it should be readily apparent that the device is extremely accurate at all speed ranges.

In the embodiment of FIG. 3, the magnetic current meter 37 was mounted on the underside of the hull of the watercraft. It is also possible to mount this device at the transom of the watercraft as shown in solid lines in FIG. 6. Alternatively, the device 37 may be mounted directly on the outboard motor 32 so that the complete speed sensing sensors are a part of the outboard motor. Various other alternative locations are possible.

In the embodiments of the invention as thus far described, the semiconductor pressure sensor has been utilized in combination with a magnetic current meter type of speed sensor. It is to be understood, however, that the invention can be utilized in conjunction with other types of speed sensors that will have a higher degree of accuracy or resolution at the speed ranges when the semiconductor pressure sensor gives less than desired results. FIG. 7 shows another such embodiment which uses, in combination with the semiconductor pressure sensors of the type previously described, a propeller type dynamic flow sensor, indicated generally by the reference numeral 61. This sensor 61 includes a propeller 62 that is mounted on the hull of the watercraft 21 in a location so that it will rotate in response to movement of the watercraft 21 through the body of water in which it is moving. This may be either at the transom as shown in solid lines or on the underside of the hull as shown in phantom lines.

The output from the propeller type flow detecting sensor 61 is outputted through a conduit or conductor 63 to the combined speed calculating and indicating device 39 which may be generally of the type previously described. In addition, the relationship of the semiconductor pressure sensor to the system is the same as the previously described embodiments and, for that reason, the components which are the same have been identified by the same reference numerals and will be described again only insofar as is necessary to understand the construction and operation of this embodiment.

In the embodiments of the invention as thus far described, the semiconductor pressure sensor 36 has been complimented by a device which actually measures watercraft speed through cooperation with the body of water. It is to be understood, however, that other types of speed detecting and indicating devices may be used in accordance with the invention so long as they provide accurate speed indications in the area when the semiconductor pressure sensor 36 is not as accurate. For example, the invention can be used in conjunction with devices wherein the speed signal is generated by the actual rotational speed of the engine of the outboard motor 32 as such devices may be accurate under some running conditions.

Such as embodiment of the invention will be described first by reference to FIGS. 8 and 9 wherein only an outboard motor constructed in accordance with this embodiment is illustrated and is identified generally by the reference numeral 71. It is to be understood that the outboard motor 17 may include an opening 34, which is not illustrated in this figure, for providing the dynamic pressure signals to the semiconductor pressure sensor 36. Also, the relationship to the watercraft has not been illustrated because it may take the previously described forms.

Figure 8:
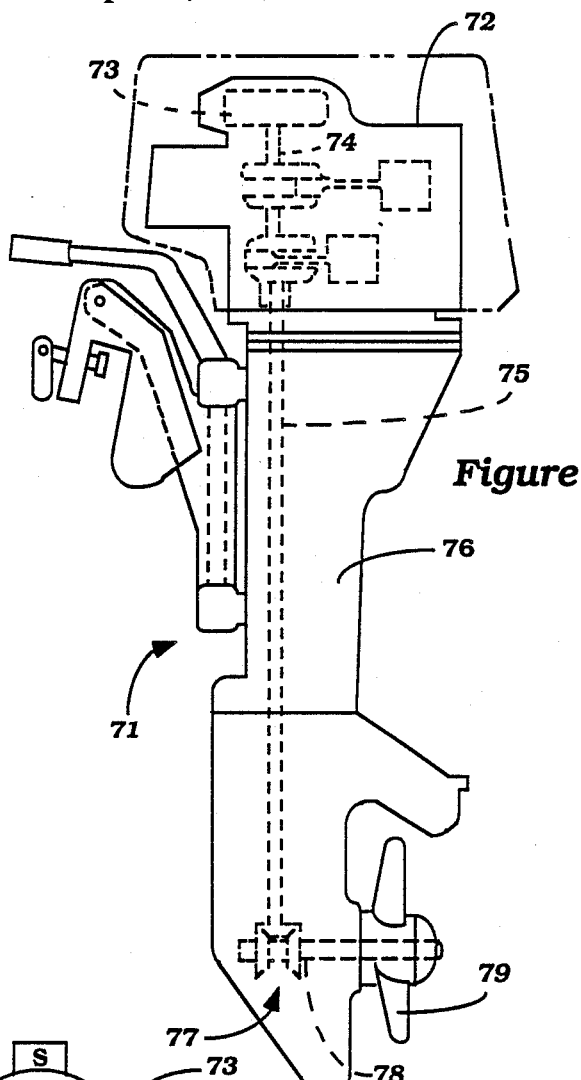
FIG. 8 is a side elevational view of an outboard motor incorporating a speed detecting device in accordance with a still further embodiment of the invention.

Referring specifically to these figures and to FIG. 8, the outboard motor 71 includes an internal combustion engine 72 which, in the illustrated embodiment, is of the spark ignited type and includes a magneto generator 73 that is driven by the crankshaft 74 of the engine in a known manner. The crankshaft 74 also drives a drive shaft 75 that is journaled in the drive shaft housing, lower unit 76. Within the lower unit, the drive shaft 75 operates a selectively engageable forward, neutral, reverse transmission 77 of a known type embodying counterrotating bevel gears and a dog clutching arrangement (not shown) for selectively coupling the drive shaft to a propeller shaft 78 that rotatably drives a propeller 79.

Figure 9:
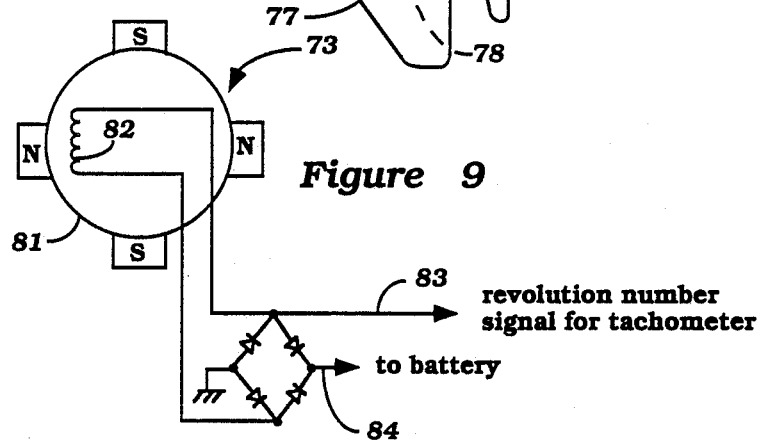
FIG. 9 is a partially schematic view showing the construction of components of the outboard motor shown in FIG. 8.

Referring now specifically to FIG. 9, the magneto generator 73 includes a rotating magnet assembly 81 that cooperates with a generating and/or pulsing coil 82 which, in turn, outputs a signal through a conductor 83 which conductor will pass the signal to the calculating and indicating device 39 of the previously described embodiments. A battery 84 is also charged by the generating coil 82 through a diode bridge in a known manner.

Referring now to FIG. 10, the relationship of the components are illustrated. Referring now specifically to this embodiment, it should be noted that the output signal on the conductor 83 from the magneto generator 73 is not transmitted to the analog/digital converter as with the previously described embodiment since its output is digital. Rather, this digital output is transmitted to the CPU 43 for processing by the speed calculating means 42. The speed calculating means 42 also receives an input signal from a transmission detector 84 which serves to provide an indication as to whether the transmission 77 is in forward gear or not. In addition, a gear ratio data signal 85 is supplied that indicates the gear ratio of the transmission 77. In addition, a propeller pitch signal 86 is transmitted to give an indication of the pitch of the propeller 79 utilized on the outboard motor. From all of these signals, the speed calculating device 42 is able to calculate a digital speed signal that is indicative of the speed of the watercraft and this signal is transmitted back to the analog to digital converter 41 so as to provide the speed indication in the routine now to be described.

Referring now to FIG. 11, the arrangement for calculating watercraft speed from the signal of the magneto generator 73, which may be considered to be a tachometer signal, is illustrated. At the step 91, the actual number of signals transmitted from the magneto generator 73 is determined. this data is then compared with the output from the gear position signal from the detector 84 at the step 92. If it is determined that the transmission is in neutral or reverse, the program jumps to the step 93 so as to provide the vehicle speed calculation independent of the engine speed.

If, however, it is determined that the transmission is in forward, the program moves to the step 94 to compare the ratio in the transmission and modify the speed signal in view of this. Also, at the step 95, the propeller pitch data from the signal 86 is compared and adjusted so as to move to the step 93 so as to provide a watercraft speed calculation dependent upon the speed of the engine. This indication is then processed in accordance with the program shown in FIG. 5 wherein the calculated speed from the tachometer output is substituted for the speed of the magnetic current meter and the routine of that figure is then followed.

It should be readily apparent from the foregoing description that a number of speed detecting devices have been illustrated and described and each of which provides a very accurate speed signal under all conditions. Although several embodiments of the invention have been illustrated and described, various other changes and modifications may be made without departing from the spirit and scope of the invention as defined by the appended claims.

We claim:

1. A running speed detector for a watercraft comprising a hull, a first speed sensor responsive to dynamic water pressure at a point to provide an output signal indicative of speed, said output signal have one range where the speed indication signal is less accurate than at other ranges, a second speed sensor having a high degree of accuracy in said one range, and display means for receiving signals from said first and said second speed sensors and displaying the output of said second speed sensor when in said one speed range and the output from said first speed sensor at other ranges.

2. A running speed detector as set forth in claim 1 wherein the first speed sensor includes a semiconductor pressure sensor device.

3. A running speed detector as set forth in claim 2 wherein the one speed range is the lower speed range of the watercraft.

4. A running speed detector as set forth in claim 1 wherein the second speed sensor comprises a magnetic current meter.

5. A running speed detector as set forth in claim 1 wherein the second speed sensor comprises a propeller type speed sensor.

6. A running speed detector as set forth in claim 1 wherein the second speed sensor includes a tachometer driven by the engine and calculating means for calculating water craft speed from engine speed.

7. A running speed detector as set forth in claim 1 wherein the display means includes processing means for accepting the input signals from the first and second speed sensors, means for determining from the second speed sensor if the watercraft is operating in the one speed range and operating the displaying means.

8. A running speed detector as set forth in claim 7 wherein the first speed sensor includes a semiconductor pressure sensor device.

9. A running speed detector as set forth in claim 8 wherein the one speed range is the lower speed range of the watercraft.

10. A running speed detector as set forth in claim 9 wherein the second speed sensor comprises a magnetic current meter.

11. A running speed detector as set forth in claim 9 wherein the second speed sensor comprises a propeller type speed sensor.

12. A running speed detector as set forth in claim 9 wherein the second speed sensor includes a tachometer driven by the engine and calculating means for calculating watercraft speed from engine speed.

13. A running speed detector as set forth in claim 12 wherein the means for determining also calculated speed from engine speed, transmission ratio and propeller pitch.

14. A running speed detector as set forth in claim 13 wherein the output of the second speed sensor is not displayed if the transmission is in neutral.

* * * * *